United States Patent

Harp

[15] 3,638,050
[45] Jan. 25, 1972

[54] PREAMPLIFICATION CIRCUITRY FOR PHOTOCONDUCTIVE SENSORS

[72] Inventor: Edgar E. Harp, Richardson, Tex.
[73] Assignee: Texas Instruments Incorporated, Dallas, Tex.
[22] Filed: Apr. 1, 1970
[21] Appl. No.: 24,606

[52] U.S. Cl..............................307/311, 250/206, 250/215
[51] Int. Cl.............................................................H03k 17/00
[58] Field of Search..................307/311, 317, 254; 250/117, 250/117 SS, 204, 215

[56] References Cited

UNITED STATES PATENTS

| | | | |
|---|---|---|---|
| 3,531,645 | 9/1970 | De Jong | 307/311 X |
| 3,152,250 | 10/1964 | Platzer, Jr. | 328/145 X |
| 3,424,908 | 1/1969 | Sitter | 307/311 X |
| 3,130,326 | 4/1964 | Habisohn | 307/254 |
| 3,492,488 | 1/1970 | Goettelmann | 250/117 SS |
| 3,535,532 | 10/1970 | Merryman | 250/117 SS |

*Primary Examiner*—Donald D. Forrer
*Assistant Examiner*—B. P. Davis
*Attorney*—Samuel M. Mims, Jr., James O. Dixon, Andrew M. Hassell, Harold Levine, Melvin Sharp, Michael A. Sileo, Jr., Henry T. Olsen, John E. Vandigriff and Gary C. Honeycutt

[57] ABSTRACT

A preamplifier circuit is disclosed for use with a photoconductive sensing device having a conductance linearly dependent upon incident photon flux. A forwardly biased diode, which in the preferred embodiment comprises a transistor having a commonly connected base and collector, is coupled to one terminal of the photoconductive sensing device. An output transistor is connected to the sensing device and the diode to provide an output signal dependent upon the magnitude of incident photon flux upon the sensing device. This output signal is not dependent upon the magnitude of conductance of the sensing device, and thus the present circuit may be used in a photoconductive sensor array to eliminate the requirement of sensor alignment. A plurality of series connected diodes are connected between a source of bias voltage and the output transistor to provide a selected constant gain to the output signal.

10 Claims, 4 Drawing Figures

3,638,050
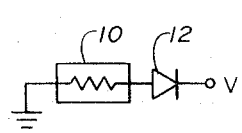
FIG. 1
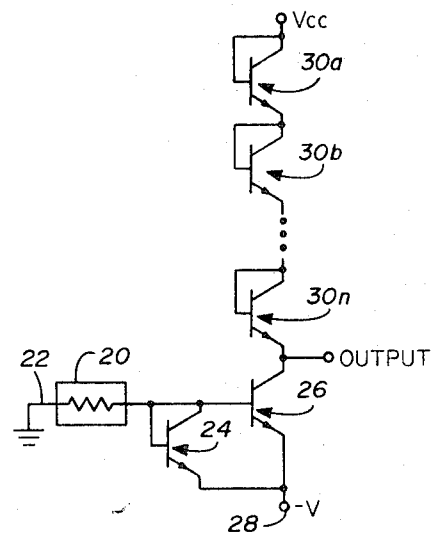
FIG. 2
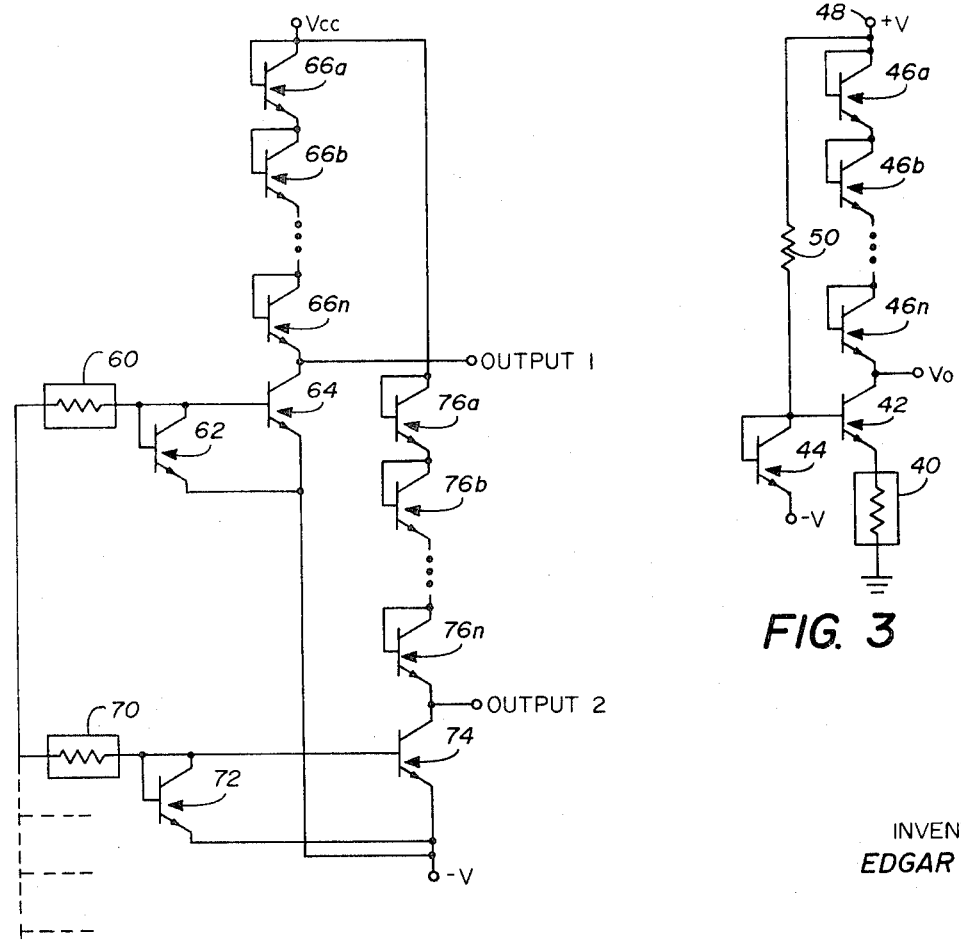
FIG. 3
FIG. 4
INVENTOR:
EDGAR E. HARP

PREAMPLIFICATION CIRCUITRY FOR PHOTOCONDUCTIVE SENSORS

This invention relates to photoconductive sensors, and more particularly to preamplification circuitry for use with photoconductive sensors having different output characteristics.

Photoconductive sensors are presently used in a variety of applications wherein it is desired to detect variances of radiation or photon flux. For example, photoconductive sensors such as mercury doped germanium sensors are presently utilized to detect objects having different temperature or infrared emissivities than ambient temperature or infrared background levels. Such photoconductive sensors with essentially infinite dark resistance have conductances which increase linearly with the incident radiation. The magnitude of the conductance of such sensors depends upon a variety of characteristics such as the senor shape, quantum efficiency, carrier lifetime and the like. This variance of conductance magnitude between different sensors has heretofore caused problems when a large number of photoconductor sensors are sued in an array, as aligning techniques have been required in order to provide the same sensitivity to each of the sensors.

In accordance with the present invention, a preamplifier circuit is provided which tends to reduce the dependence of a photoconductive output upon the magnitude of conductance of the photoconductive sensor.

In accordance with one aspect of the invention, a photoconductive sensing circuit comprises a device having a conductance linearly dependent upon incident photon flux. Circuitry is coupled to the device which has a dynamic resistance inversely dependent upon current flow therethrough. The output signal thus provided by the circuit is independent from the magnitude of conductance of the device.

In accordance with another aspect of the invention, circuitry is provided which has a generally uniform response characteristic for photoconductive sensors having conductances which vary generally linearly in dependence upon incident radiation. The circuitry includes a device for coupling with the sensors which has a dynamic resistance which varies inversely with the magnitude of current flow therethrough.

In accordance with a more specific aspect of the invention, a photoconductive sensing device is coupled to a forwardly biased diode. An electronic output device is connected to the sensing device and the diode to thereby provide an output signal dependent upon the magnitude of incident photon flux upon the sensing device. A plurality of series connected diodes are connected between a source of bias voltage and the electronic output device to provide a selected gain to the output signal.

In accordance with another aspect of the invention, a photoconductive array includes a plurality of semiconductor photoconductive devices each having a conductance proportional to incident radiation. Diodes are connected in series with each of the photoconductive devices. Output transistors are connected to each of the diodes for providing output signals representative of the incident radiation. A plurality of diodes are series connected between each of the output transistors and a source of bias voltage to provide a preselected gain to the various stages of the array.

For a more complete understanding of the present invention and for further objects and advantages thereof, reference is now made to the following description taken in conjunction with the accompanying drawings, in which:

FIG. 1 illustrates the basic configuration of the invention;

FIG. 2 illustrates the preferred embodiment of the invention;

FIG. 3 illustrates an alternate embodiment of the invention; and

FIG. 4 illustrates the preferred embodiment of the invention in a photoconductive array.

Referring to FIG. 1, a photoconductive sensor 10 is illustrated as having one terminal thereof connected to ground. The photoconductive sensor 10 according to the invention may comprise any photosensitive device having gain, in addition to having essentially infinite dark resistance so that the conductance thereof is generally linear with the incident photons/cm.$^2$-sec. For example, germanium photoconductive sensors, and in particular mercury doped germanium photoconductive sensors, may be advantageously utilized according to the invention. Additionally, other semiconductor photoconductive devices having gain, such as avalanche photodiodes, are encompassed by the invention.

It is well known that if a photoconductive sensor has essentially infinite dark resistance, its conductance increases linearly with the incident photons/cm.$^2$-sec, Thus, $$G_o = KQ_{BG} \qquad (1)$$

wherein $G_o$ = Conductance for background radiation, $K$ = A constant determined by the sensor shape, quantum efficiency, carrier lifetime and the like, $Q_{BG}$ = Background photons/cm.$^2$-sec.

Due to the linear dependence of carrier concentration on incident radiation of photoconductive sensors having essentially infinite dark resistance, the ratio of change of conductance for incident signal photons to the conductance for background radiation is equal to the ratio of signal-to-background radiation, as evidenced by:

$$\Delta G/G_o = Q_s/Q_{BG} \qquad (2)$$

wherein, $Q_s$ = Signal photons/cm.$^2$-sec. deviation from background radiation, and $\Delta G$ = Change in conductance due to $Q_s$.

Biasing such a photoconductive sensor with a constant voltage provides:

$$i_s/I = V\Delta G/VG_o = Q_s/Q_{BG} \qquad (3)$$

wherein, $i_s$ = Signal current, $I$ = DC current, $V$ = Detector voltage bias.

The dynamic resistance $r_d$ of a forwardly biased diode at temperature $T$ may be given by:

$$r_d = kT/qI \qquad (4)$$

wherein, $k$ = Boltzman's constant, and $T$ = Absolute temperature.

If a diode 12 is connected in series with the remaining terminal of the photoconductive sensor 10, as shown in FIG. 1, the signal voltage $V_d$ across the diode 12 is given by:

$$V_d = \frac{kT}{qI} i_s \qquad (5)$$

By substituting equation (3), Equation (5) may be written as:

$$V_d = kT Q_s/q Q_{BG} \qquad (6)$$

Inspection of equation (6) will indicate that the signal voltage across the diode 12 is not dependent upon the conductance characteristics of the sensor 10, so long as the resistance of the detector is background limited. In the preferred embodiment, it is desirable to make the dynamic resistance of the diode 12 small compared to the resistance of the sensor 10, and thus the sensor bias voltage $V$ should be largely compared to $kT/q$, which is true for germanium photoconductive sensors. From the foregoing, it will be understood that the circuit shown in FIG. 1 provides an output signal which is dependent upon the incident photon flux upon the sensor 10, and yet which is independent of the conductance characteristics of the sensor 10. As will be later described, arrays of series connected photoconductive sensors and forwardly biased diodes may thus be utilized without the requirement of aligning the various detectors to the same sensitivity.

FIG. 2 illustrates the preferred embodiment of the invention and comprises a photoconductive sensor 20 according to the invention which has a first terminal 22 connected to circuit ground. The remaining terminal of the sensor 20 is coupled to the base and collector of a transistor 24. As is known, this configuration of a transistor provides near ideal diode characteristics. The terminal of the sensor 20 and the base and collector of transistor 24 are also commonly tied to the base of an output transistor 26. The emitters of transistors 24 and 26 are tied to a terminal 28 for reception of a negative bias voltage. In the preferred embodiment, transistors 24 and 26 are matched to form a unity current gain combination which is stable over a wide range of conditions. An output voltage proportional to the incident photon flux upon the sensor 20 appears at the collector of transistor 26. The diode connected transistor 24, along with the sensor 20, forms the circuit as previously described with respect to FIG. 1.

A positive bias voltage is applied to the collector of transistor 26 through a series of diode connected transistors 30a–n. Each of these transistors has a commonly connected base and collector to act as a near ideal diode. It may be shown that the voltage gain from the base to collector of the transistor 26 is equal to:

$$A = N\alpha/\alpha_o \quad (7)$$

wherein, $A$ = Voltage gain of transistor 26, $N$ = The number of diode connected transistors connected to the collector of transistor 26, and $\alpha/\alpha_o$ = Is the ratio of AC to DC common base current gain for transistor 26. The number of diode connected transistors 30a–n will thus vary according to the desired circuit parameters.

The signal-to-noise ratio of the circuit shown in FIG. 2 may be referred to the signal-to-noise ratio of the sensor 20 in the following manner:

$$\left(\frac{S}{N}\right)_{\text{cir}} = \left(\frac{S}{N}\right)_{\text{det}} \left[1 + \frac{1}{G} + \frac{1}{2NG}\right]^{-1/2} \quad (8)$$

wherein, $G$ = Photoconductive gain.

In a typical circuit according to the invention, $G$ is generally greater than 15, thereby resulting in negligible degradation of signal-to-noise ratio for the circuit.

A function of the diode connected transistors 30a–n in the collector circuit of transistor 26 is to provide sufficient gain such that the magnitude of the noise voltage at the output of the transistor 26 is large compared to the equivalent input noise voltage of the following stages connected to the circuit shown in FIG. 2. The magnitude of the output noise voltage of the circuit is approximately:

$$V_n = 2\left(\frac{NkT}{q}\right)\left(\frac{qG}{I}\right)^{1/2}\left(\frac{V}{Hz}\right)^{1/2} \quad (9)$$

At a temperature of 25° C., the noise voltage for $I = 100\ \mu$ amps for the circuit shown in FIG. 2 may be represented as:

$$V_n = 2NG^{1/2}\left(\frac{nV}{Hz}\right)^{1/2} \quad (10)$$

The gain of the circuit shown in FIG. 2 will vary predictably with variances in temperature. This variation may be partially compensated for in later stages. By maintaining all the circuits in a photoconductive array at the same temperature, first order temperature variance effects would be virtually eliminated.

FIG. 3 illustrates another embodiment of the invention utilizing a photoconductive sensor 40 of the type previously described for use with the invention. One terminal of the sensor 40 is connected to circuit ground, with the remaining terminal being connected to the emitter of an output transistor 42. The base of transistor 42 is connected with the commonly tied base and collector of a transistor 44. Bias voltage is applied to the emitter of transistor 44. The configuration of transistors 42 and 44 will be recognized as the unity gain configuration shown in FIG. 2, such that an output voltage is applied at the collector of transistor 42. Transistor 44 is connected in a diode configuration to provide circuit independence with respect to the particular conductance characteristics of the sensor 40.

A plurality of diode connected transistors 46a–n are connected in series between the source of bias voltage applied to terminal 48 and the collector of the transistor 42. A resistance 50 is also connected between the terminal 48 and the base of transistor 42. The diode connected transistors 46a–n and the resistor 50 provides a bias to the present circuit in a similar manner as that described with respect to FIG. 2.

FIG. 4 illustrates an array of photoconductive sensors, with only two sensor stages being illustrated. A photoconductive sensor of the type previously described is connected at one terminal to circuit ground and is connected at the other terminal to the commonly connected base and collector of a transistor 62. The terminal of the sensor 60 is also connected to the base of an output transistor 64. The collector of transistor 64 provides an output 1 in the manner previously described. The emitters of transistors 62 and 64 are connected to a source of negative voltage potential. The collector of transistor 64 is connected to a series of diode connected transistors 66a–n, the number of which determine the output gain of the circuit. A source of positive voltage supply is connected to the series connected diode transistors 66a–n.

A second sensor stage comprises a sensor 70 connected through a diode connected transistor 72 to the base of an output transistor 74. The collector of transistor 74 thus provides an output 2. The collector of transistor 74 is connected to the source of positive bias voltage through a series of diode connected transistors 76a–n in the manner previously described. A plurality of additional sensors and preamplifying circuits will normally be provided in the array shown in FIG. 4. With the use of the present invention, alignment of the sensitivities of the various photoconductive sensors is not required, and thus the various outputs are equal for equal intensities of light impinging upon the various sensors.

The present circuit is particularly adapted to construction by integrated circuit techniques. For instance, each of the transistors illustrated in the various embodiments could be constructed on a single semiconductor substrate. For instance, each of the transistors of the circuit may be identical and comprise a double diffusion of an epitaxial layer, with diffused isolation portions being disposed between the various transistors for isolation purposes. Such transistors may be constructed by conventional techniques. By constructing transistors of the present circuits on a single semiconductor surface, each of the transistors may be closely matched.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. A photoconductive sensing circuit comprising:
   a. a photosensitive device having a conductance dependent upon incident photon flux, and having one terminal connected to circuit ground and another terminal for receiving a bias voltage;
   b. diode means coupled to said another terminal of said device having a dynamic resistance inversely dependent upon current flow therethrough operative to produce an output signal substantially independent from the magnitude of conductance of said photosensitive device;
   c. an output transistor having its base connected to the junction between said device and said diode means for providing an output signal, and further having an emitter connected to a voltage source; and
   d. bias means for supplying a predetermined bias voltage to the collector of said output transistor, thereby producing a predetermined voltage gain.

2. The circuit of claim 1 wherein said diode means comprises a forward biased diode having one electrode connected to a negative voltage source.

3. The circuit of claim 2 wherein said diode comprises:
a transistor having the base and collector thereof commonly connected to a terminal of said device, and having its emitter connected to said negative voltage source.

4. The circuit of claim 3 wherein said bias means for supplying comprises:
a plurality of series connected diodes connected between a source of positive bias voltage and said output transistor.

5. Circuitry for providing generally uniform response characteristics to a photoconductive sensor having a conductance which varies substantially linearly with incident radiation comprising:
 a. a photoconductive sensor having two terminals, one of said terminals connected to circuit ground;
 b. a diode device having a terminal connected to a voltage source, having a dynamic resistance which varies inversely with the magnitude of current flow therethrough;
 c. an output transistor having a base connected to said device, and further having an emitter connected to the other terminal of said sensor; and
 d. bias means for supplying a predetermined bias voltage to the collector of said output transistor, thereby producing a predetermined voltage gain.

6. The circuitry of claim 5 wherein said diode device comprises:
a forward biased diode having a terminal connected to a negative voltage source.

7. The circuitry of claim 6 wherein said diode comprises:
a transistor having a commonly connected base and collector.

8. A photoconductive array comprising:
 a. a plurality of semiconductor photoconductive devices, each device having two terminals and one of said terminals connected to circuit ground, the other terminal for receiving a bias voltage and each further having a conductance proportional to incident radiation;
 b. a plurality of diode means, each connected in series to said other terminal of each of said photoconductive devices;
 c. a plurality of output transistors, each having its base terminal connected to one of said diode means, and having a collector terminal for providing an output signal proportional to the incident radiation, and further having an emitter connected to a negative voltage source; and
 d. a plurality of diodes connected in series between the collector of each said output transistor and a source of positive bias voltage.

9. The array of claim 8 wherein each said diode means comprises a transistor having a commonly connected base and collector, and having an emitter common to the emitter of said output transistor.

10. The array of claim 9 wherein said commonly connected base and collector are connected to the base of said output transistor.

* * * * *